(12) United States Patent  (10) Patent No.: US 7,857,016 B2
Baudoux  (45) Date of Patent: Dec. 28, 2010

(54) PLASTIC ADAPTER FOR FUEL TANK

(75) Inventor: Patrice Baudoux, Flavy le Martel (FR)

(73) Assignee: Inergy Automotive Systems Research (Société Anonyme, Brussels (BE)

( * ) Notice: Subject to any disclaimer, the term of this patent is extended or adjusted under 35 U.S.C. 154(b) by 831 days.

(21) Appl. No.: 11/719,264

(22) PCT Filed: Nov. 15, 2005

(86) PCT No.: PCT/EP2005/055976

§ 371 (c)(1),
(2), (4) Date: May 14, 2007

(87) PCT Pub. No.: WO2006/051117

PCT Pub. Date: May 18, 2006

(65) Prior Publication Data

US 2009/0078336 A1  Mar. 26, 2009

(30) Foreign Application Priority Data

Nov. 15, 2004 (FR) .................................. 04 12093

(51) Int. Cl.
*B60K 15/04* (2006.01)
(52) U.S. Cl. .................. 141/346; 141/348; 141/350; 220/86.2; 285/22
(58) Field of Classification Search .............. 141/348, 141/350, 370, 346; 220/86.1–86.2; 285/22
See application file for complete search history.

(56) References Cited

U.S. PATENT DOCUMENTS

| 5,159,953 | A | | 11/1992 | Sato et al. |
| 5,390,808 | A | * | 2/1995 | Choma et al. .............. 220/86.2 |
| 5,732,840 | A | | 3/1998 | Foltz |
| 5,826,918 | A | * | 10/1998 | Bowles et al. ................. 285/24 |
| 5,957,415 | A | * | 9/1999 | Perea .......................... 248/58 |
| 6,234,195 | B1 | * | 5/2001 | Kippe et al. ............. 137/493.3 |
| 6,336,482 | B1 | | 1/2002 | Cunkle et al. |
| 6,338,362 | B1 | | 1/2002 | Gabbey et al. |
| 6,942,124 | B2 | * | 9/2005 | Dehn et al. ................ 220/86.2 |
| 7,083,065 | B2 | * | 8/2006 | Zdroik ....................... 220/562 |
| 7,159,741 | B2 | * | 1/2007 | Dehn et al. ................ 220/86.2 |
| 2001/0025652 | A1 | * | 10/2001 | Sugizaki et al. ............. 137/202 |
| 2005/0217735 | A1 | | 10/2005 | Firtion et al. |

FOREIGN PATENT DOCUMENTS

| DE | 3621948 | 1/1988 |
| EP | 0 783 989 | 7/1997 |
| FR | 2 821 800 | 9/2002 |

OTHER PUBLICATIONS

U.S. Appl. No. 10/571,114, filed Mar. 8, 2006, Baudoux et al.
U.S. Appl. No. 10/571,537, filed Mar. 10, 2006, Baudoux et al.
U.S. Appl. No. 11/815,454, filed Aug. 3, 2007, Baudoux et al.

* cited by examiner

*Primary Examiner*—Gregory L Huson
*Assistant Examiner*—Nicolas A Arnett
(74) *Attorney, Agent, or Firm*—Oblon, Spivak, McClelland, Maier & Neustadt, L.L.P.

(57) ABSTRACT

A plastic adapter for fuel tanks. The adapter includes crimping lugs for fixing the adapter to a pipe or an opening in the tank.

12 Claims, 5 Drawing Sheets

PLASTIC ADAPTER FOR FUEL TANK

BACKGROUND OF THE INVENTION

Description of Related Art

Fuel tanks for motor vehicles are increasingly being based on plastic particularly for reasons of low weight (by comparison with their metal counterparts) and the better possibilities of moulding complex shapes Traditionally plastic tanks have been produced by extrusion/blow-moulding. This then yields an envelope through which openings are made to accommodate the various functionalities of the fuel system including the filling system The latter generally consists:

of a filling cap to shut it off
of a filling head and a nozzle guide which generally constitute what is known as the filling adapter
and of a filling pipe.

Adapters (filling adapters and other adapters), just like the tanks themselves, are generally either made of metal or made of plastic. Metal adapters are generally either connected by crimping to plastic or metal pipes or welded to metal pipes. Plastic adapters for their part are generally connected to plastic pipes also, and usually, by welding these two components directly together. However, such a connection entails a welding operation the duration and technical complexity of which are not insignificant when assembling a fuel system Alternatively, a simple mechanical connection between adapter and pipe may be realized by means of a system involving the use of a flange, bolts, a clamping collar, etc. However, such a system often does not allow the adapter to be removed without damage to its components, and/or is not well enough sealed to be used alone (without additional fixings).

Thus, document DE 3621948 describes the idea of equipping a fuel tank adapter/pipe with a metal insert to strengthen the connection between these two parts, which is realized through a separate fixing mechanism (clamping collar) Such a system therefore has recourse to two separate parts, which have to be fixed to the pipe/adapter.

SUMMARY

The object of the invention therefore is a fuel tank adapter which can easily and quickly be mounted on a pipe or an opening without resorting to an additional welding or mechanical fastening operation, the said connection however being mechanically very strong and capable of being disassembled/reassembled easily, without damage to its components.

To this end, the invention relates to a plastic adapter for fuel tan, the said adapter comprising cri ping lugs for fixing it to a pipe or an opening in the tank.

BRIEF DESCRIPTION OF THE DRAWINGS

The present invention is illustrated nonlimitingly by FIGS. 1 to 5, FIGS. 1 to 3 illustrating a $1^{st}$ variant (with metal insert) and FIGS. 4 and 5 illustrating a second variant (with the lugs incorporated directly onto the adapter and the use of clamp).

DETAILED DESCRIPTION

Figure 1:
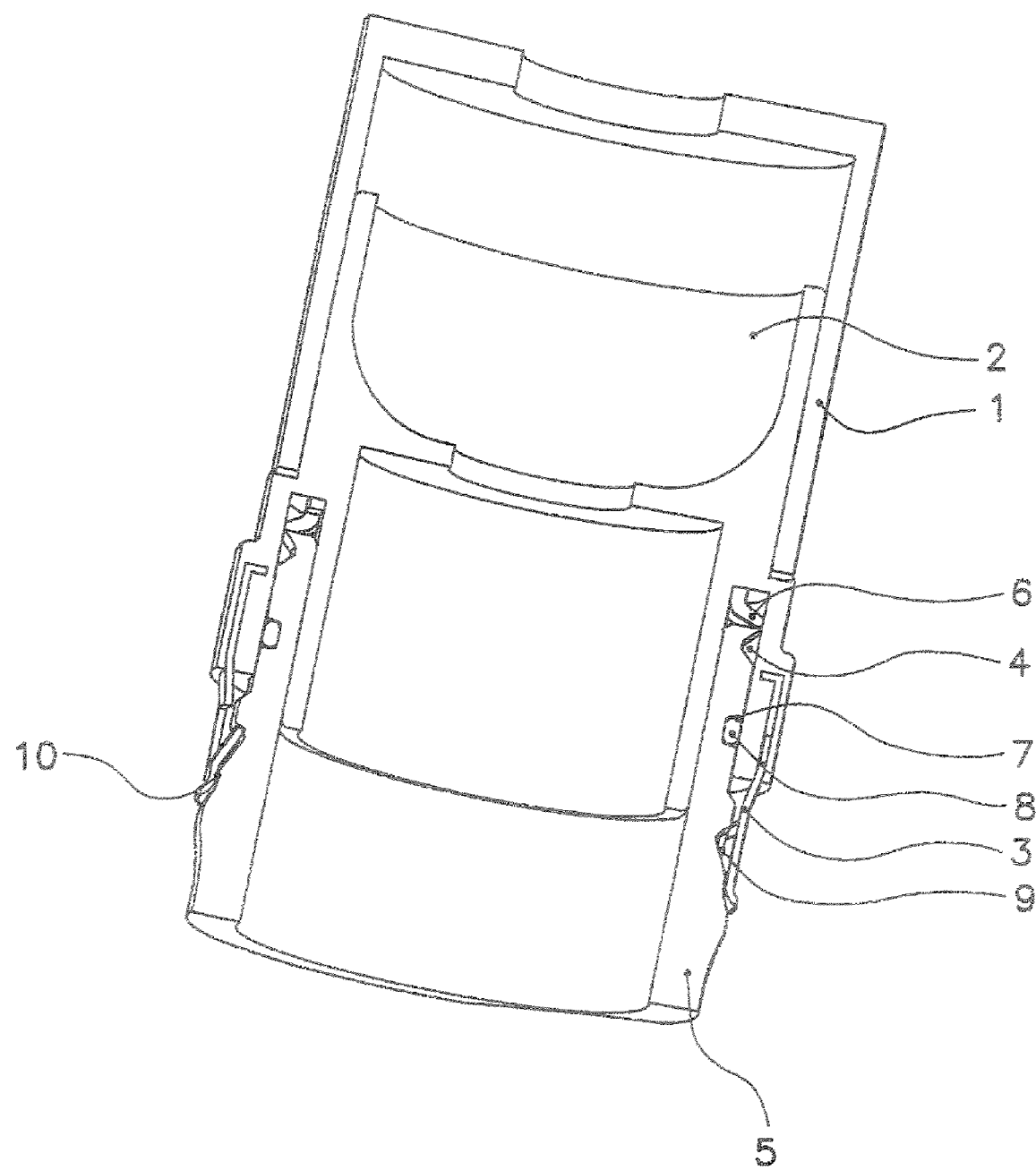

The term "adapter" is to be understood in the broadest sense and denotes in fact a part of substantially cylindrical shape which is intended to be connected generally either to a part of substantially tubular shape (a pipe, a flange, etc) already incorporated into the tank, or to an opening made in the tank, the geometry of the part or of the opening being such that it allows the adapter to be fixed by crimping. For preference, the adapter is fixed to a pipe. The present invention yields good results when the adapter is a filling adapter and is fixed to the filling pipe of the tank.

"Crimping" is to be understood as meaning an operation during which the lugs are deformed (either permanently or temporarily), these lugs becoming positioned on the pipe or the opening (which has a special shape for accepting these lugs) in order to mechanically secure the adapter. Note that the crimping may be internal or external, i.e. that the adapter may either be inserted in the opening or the pipe, or may be slipped over the top.

A "lug" is to be understood as meaning any type of relief (both recessed, such as an orifice for example, or protrusion such as a fixing tab for example) and which is either able to collaborate with a complementary relief on the pipe or the opening, or flexible enough to be able to deform and catch on the pipe or the edge of the opening by clipping For preference, these are actual lugs proper, i.e. fixing tabs.

According to the invention, the adapter comprises at least 2 crimping lugs which are preferably arranged in such a way as to be fixed diametrically opposite one another to the pipe or the opening with the purpose of providing a firm connection thereon. For preference, it comprises at least 3 or even 4 of these arranged in such a way as to be fixed at regular intervals to the periphery of the pipe or of the opening, the reason for this being so that the forces exerted when the fastening is stressed are distributed symmetrically.

According to the invention, the adapter may incorporate the lugs directly, i.e. these lugs may be produced as one piece with it. This variant is well suited to moulded adapters, for example those based on thermoplastic.

Alternatively, the lugs may be incorporated into an insert, preferably a metal insert. An "insert" is to be understood as meaning a part mechanically secured to the adapter and arranged in such a way as to be able to be fixed to a pipe or an opening by means of its lugs while at the same time keeping the inlet to this pipe or opening clear. In the case of a filling adapter and a pipe, the lugs are preferably fixed to the exterior surface of the filling pipe so as not to reduce (obstruct) the filling cross section of this pipe and to make assembly easier.

Any metal is suitable as a material from which to make the insert. For preference, the metal chosen is a stainless steel or a metal bearing a suitable coating, this being in order to ensure better resistance to corrosion, stonechips, mud, etc.

Note that according to this variant of the invention, the insert is not necessarily made as a single piece. It might be possible, for example, to make each lug as one piece, the various lugs (pieces) then being somewhat directly fixed to the adapter. However, for simplicity reference may be made hereinafter to just one insert. This insert may have any shape. For preference, it will have a substantially annular shape so that it can be placed concentrically with respect to the end of the pipe or the opening for which it is intended (the reason for this being that the forces exerted during fastening should be evenly distributed).

The insert may be rendered integral with the adapter by any appropriate method. One method which is particularly suitable because it involves no specific fastening step, is to overmould the insert with at least some of the adapter. Thus, for preference, when the adapter is a filling adapter and comprises a filling head and a nozzle guide (generally inserted at least partially into the filling head), it is advantageous for the insert to be overmoulded with the nozzle guide (i.e. to be at least partially trapped by at least part of the material of which this guide is made). For preference, at least part of the insert for s an integral part of the wall of the adapter (i.e. comprises moulded material on both its opposite sides). In this case, a suitable design of the two parts (complementary shapes) and/or chemical modification of the material of which the adapter is made will ensure the desired mechanical bond between the two parts. One particularly suitable way of achieving this is to equip the insert with orifices which become filled with a fraction of the plastic of the adapter during overmoulding. Depending on their geometry and their shape, these two parts may be welded screwed or clipped.

The plastic of which the adapter according to the invention (and therefore of which the head and the nozzle guide as appropriate) is/are made is preferably polyacetal and, in particular, POM (polyoxymethylene) this in view of better meeting the emissions standards (LEV II in the US for example).

As explained previously, the adapter according to the invention is intended to be mounted on a pipe or an opening of a fuel tank. In consequence, the present invention also relates to a fuel tank comprising a pipe or an opening onto which an adapter as descried hereinabove is crimped. The fuel tank according to this variant of the invention is preferably a plastic tank and or a tank equipped with a plastic filling pipe.

Within the context of the present invention, the term "plastic" denotes any material comprising at least one synthetic resin polymer.

All types of plastic may be suitable. Particularly suitable plastics come from the thermoplastics category.

The term "thermoplastic" denotes any thermoplastic polymer, including thermoplastic elastomers, as well as blends thereof. The term "polymer" denotes both homopolymers and copolymers (especially binary or ternary copolymers). Examples of such copolymers are, nonlimitingly, random copolymers, linear block copolymers, other block copolymers and graft copolymers.

Any type of thermoplastic polymer or copolymer whose melting point is below the decomposition temperature is suitable. Synthetic thermoplastics that have a melting range spread over at least 10 degrees Celsius are particularly suitable. Examples of such materials include those that exhibit polydispersion in their molecular weight.

In particular, polyolefins, polyvinyl halides, thermoplastic polyesters polyketones, polyamides and copolymers thereof may be used. A blend of polymers or copolymers may also be used, as may a blend of polymer materials with inorganic, organic and or natural fillers such as, for example, but non-limitingly, carbon, salts and other inorganic derivatives, natural fibres, glass fibres and polymeric fibres. It is also possible to use multilayer structures consisting of stacked layers bonded together comprising at least one of the polymers or copolymers described above.

Polyolefins are generally preferred. One polymer often used is polyethylene. Excellent results have been obtained with high density polyethylene (HDPE). This may have undergone a surface treatment (fluoration or sulphonation, etc.) or may comprise a layer of barrier material (for example of EVOH or a copolymer of ethylene and partially hydrolysed vinyl acetate) the purpose of which is to render it impermeable to the fuel for which the tank is intended.

According to the invention, the pipe or the opening (or more exactly its periphery) preferably comprises a relief intended to collaborate with the adapter crimping lugs. In particular, the pipe/opening may be equipped with channel(s) (or recessed circular part(s) on their periphery) having a suitable profile for holding the lugs in place once they have been inserted therein. In this case, the lugs advantageously have the form of flexible tabs which become housed in the channel or channels by deformation.

When the adapter is crimped onto a pipe and comprises a metal insert, according to an advantageous variant, the end of the said pipe has an annular surface and is in contact with a corresponding annular surface on the adapter. The term "corresponding" is to be understood as meaning that the two surfaces have a geometry such that they are at least partially in contact with one another. This contact may be direct but advantageously the axial movement between the two parts is limited by a compression washer inserted between the two contact surfaces. This washer is preferably made of a metallic or plastic elastic material so as to allow for good firm crimping onto the pipe.

According to a particularly preferred embodiment, the adapter comprises a groove (generally at the nozzle guide in the case of a filler adapter), the bottom of which at least partially constitutes the aforementioned annular surface. This approach leads to a connection that is particularly strong in terms bending. In this case, the insert is generally overmoulded over the external part of the groove.

When the adapter is crimped onto a pipe, whether or not it comprises a metal insert it is generally crimped thereto in such a way that the two parts have at least part of their surface (the internal surface in the case o one of them and the external surface in the case of the other) in common (or, more specifically, in direct contact). In this case, it may be advantageous (particularly in the case of an adapter directly incorporating the crimping lugs) for at least part of this surface to be gripped by a clamp so as to strengthen the connection or improve its sealing.

Finally, in order to obtain a perfectly sealed connection between the adapter and the pipe or the opening (or, more specifically, its periphery), it is also advantageous to insert a seal between the two, preferably an O-ring or circular seal. For preference, this seal is based on a fluoroelastomer (FPM for example) the reason for this being to best meet the emissions standards (LEV II in the US for example). In, the case mentioned hereinabove in which the adapter has a groove for accommodating the end of the filing pipe, the seal is advantageously located in this groove. Advantageously, the filling pipe is then equipped with a channel at this point in order to accommodate the seal. The dimensions of this channel will be tailored to the desired amount of compression to be applied to the seal.

Figure 2:
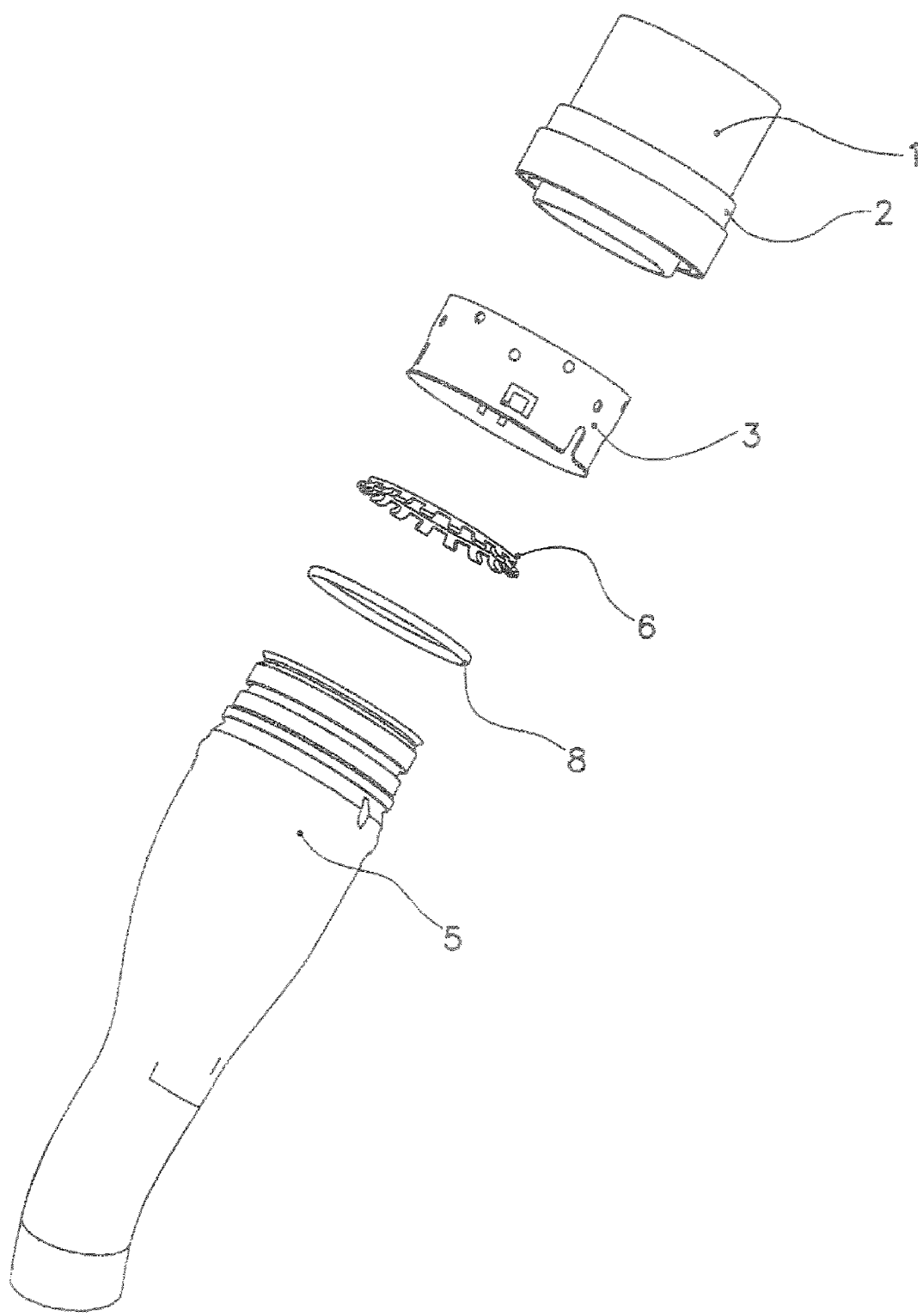
Figure 3:
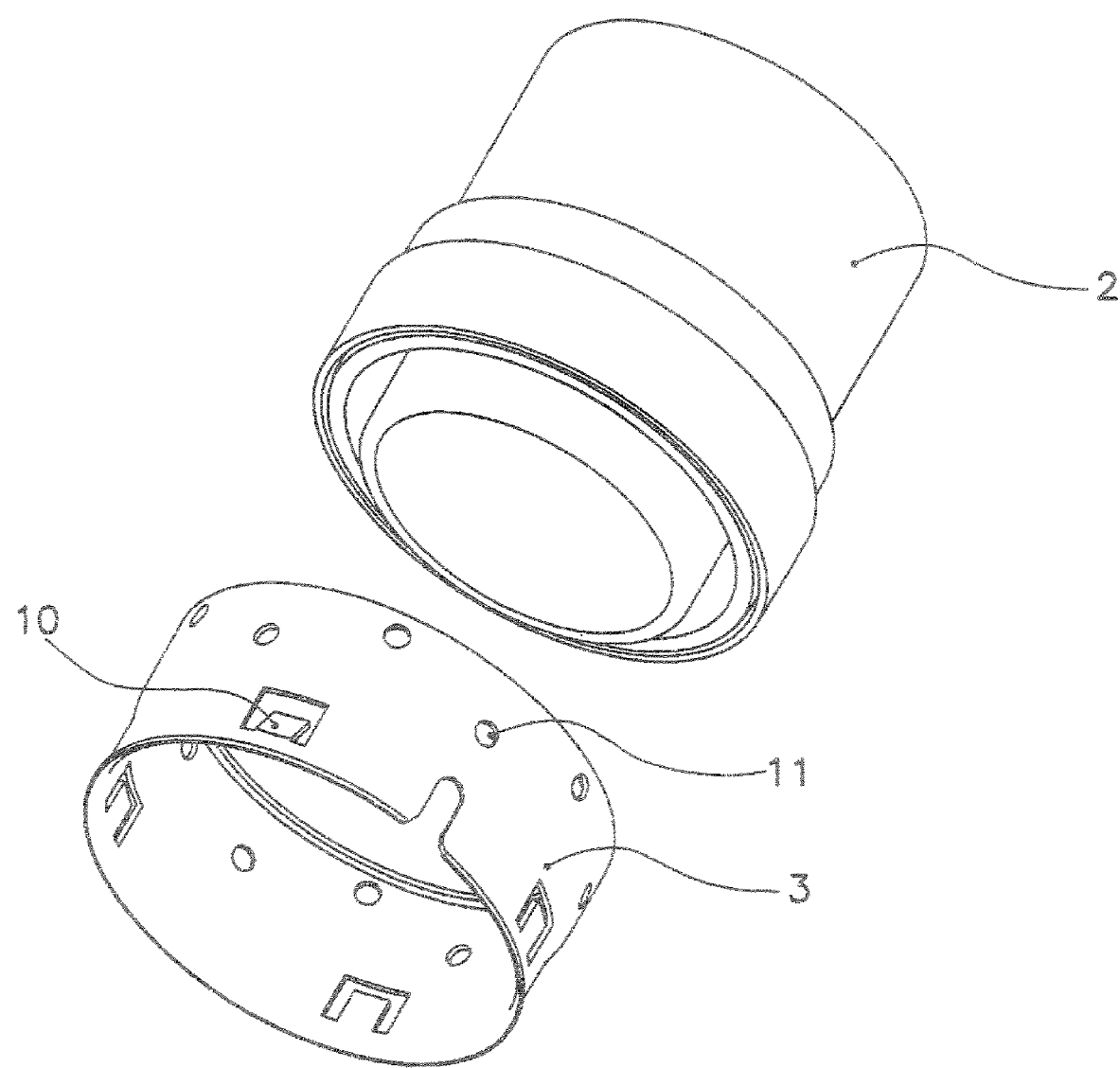
Figure 4:
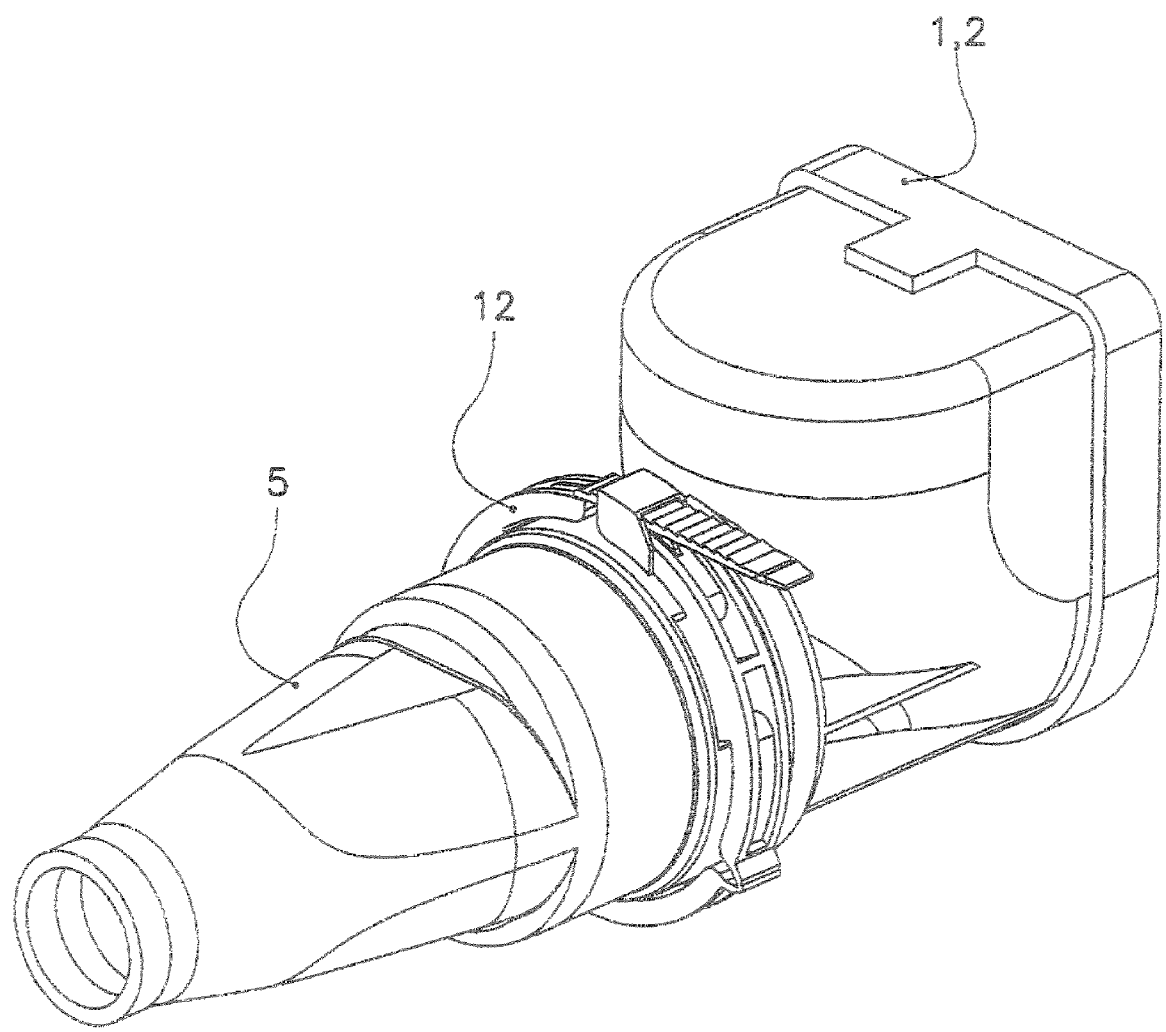
Figure 5:
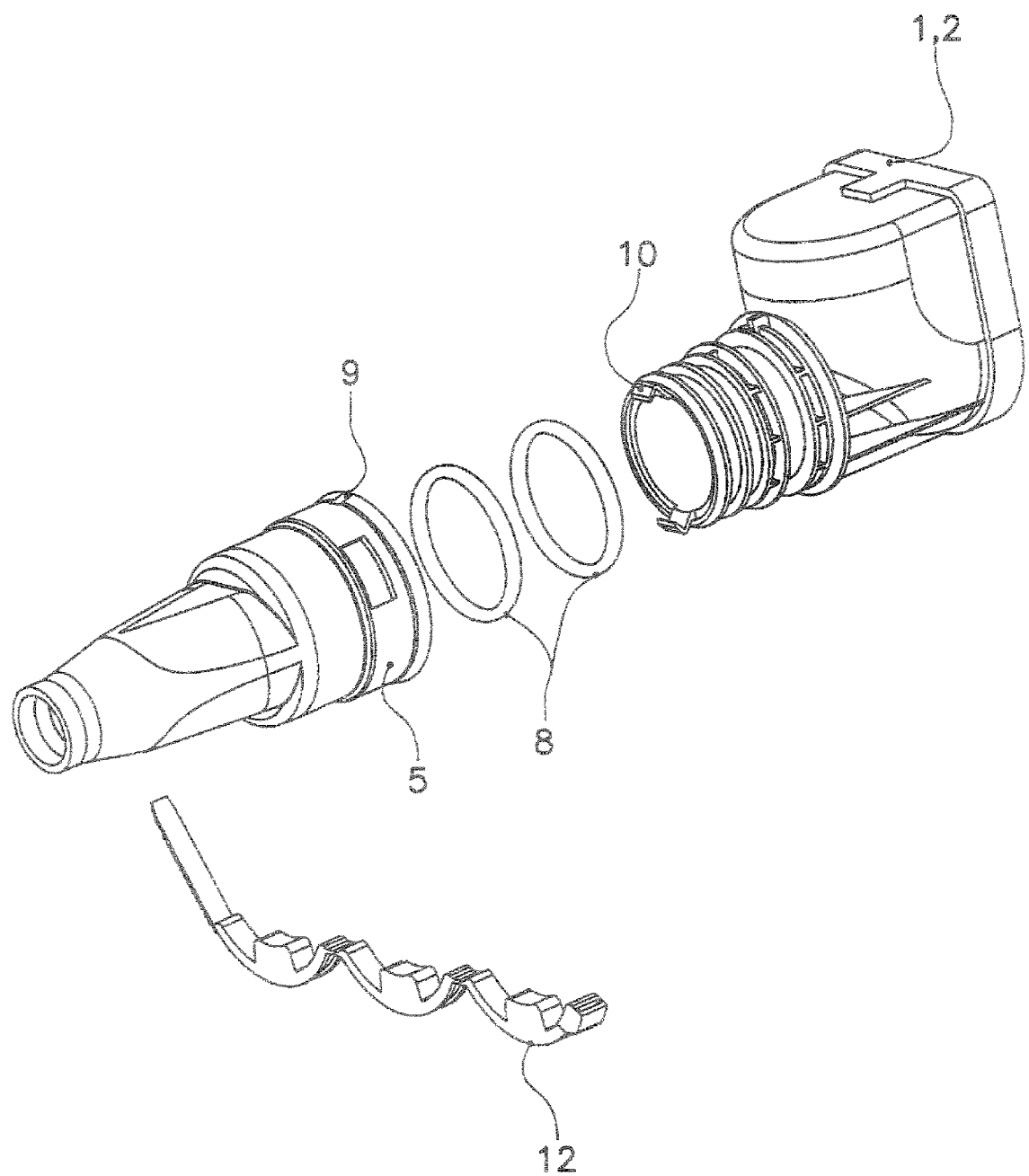

The present invention is illustrated nonlimitingly by FIGS. 1 to 5, FIGS. 1 to 3 illustrating a $1^{st}$ variant (with metal insert) and FIGS. 4 and 5 illustrating a second variant (with the lugs incorporated directly onto the adapter aid the use of clamp).

FIGS. 1 to 3: Variant with Metal Insert

FIG. 1 depicts a cross section (on a plane containing the axis of the parts) through an adapter and a filling pipe for a fuel tank according to an advantageous variant of the present invention. FIG. 2 depicts a 3-dimensional exploded view of the constituent components of this adapter/pipe and FIG. 3 depicts a detail of the insert of the nozzle guide which are illustrated in the preceding figure.

In these figures, identical numerals denote identical parts. Thus, it is possible in these figures to see a head of a pipe (1) connected to a nozzle guide (2) partially overmoulded over a metal insert (3). The nozzle guide (2) comprises a groove (4) into which a filling pipe (5) is partially inserted. The end of this pipe (5) and the bottom of the groove (4) have corresponding annular surfaces and a compression washer (6) is inserted between these two surfaces The filling pipe (5) comprises a $1^{st}$ channel (7) intended to accommodate a seal (8), and a $2^{nd}$ channel (9) intended to wedge crimping lugs (10) present on the insert (3). The insert (3) also comprises orifices

(11) intended to be filled with some of the material of which the nozzle guide (2) is made during overmoulding.

FIG. 1 clearly shows how the parts are arranged with respect to one another when the adapter is mounted on the pipe and, in particular, shows the overmoulding of the insert (3) by the nozzle guide (2) at the external part of the groove (4);

the insertion of the compression washer (6) between the nozzle guide (2) and the pipe (5), in the bottom of the groove (4);

the insertion of the lug (10) in the channel (9) of the pipe (5); and the presence of the seal (7) in the channel (8) of the pipe (5).

FIG. 2 shows the various parts which will be assembled at the time of crimping, namely:

the adapter comprising the head (1) and the nozzle guide (2);

the insert (3);

the filling pipe (5);

the compression washer (6) and the seal (8).

Finally, FIG. 3 illustrates in greater detail the geometry of the insert (3) with its lugs (10) and its orifices (11) for overmoulding.

FIGS. 2 and 3 are in fact imaginary because the insert (3) therein is depicted independently of the nozzle guide (2) whereas in reality the insert (3) is overmoulded by the guide (2).

FIGS. 4 and 5: Variant with Lugs Incorporated Into the Adapter and Use of a Clamp FIG. 4 depicts an adapter in which the head of the pipe and the nozzle guide are made as one piece (1, 2) and which is inserted and crimped into a filling pipe (5) by means of lugs (10) which are moulded as a single piece with it. It also shows a clamp (12) which is clamped around the pipe (5) over the point at which the adapter is inserted.

FIG. 5 depicts an exploded view of all the assembled elements in the system illustrated in the previous figure. It in particular shows two seals (8) mounted on the adapter (1, 2) before it is inserted/crimped into the pipe (5). It also clearly shows the geometry of the lugs (10) and of the recesses (9) intended to collaborate with these and the geometry (design) of the clamp intended to insert the common surface between the pipe (5) and the adapter (1, 2) once the latter has been crimped into the pipe (5).

The invention claimed is:

1. A plastic adapter for a fuel tank, comprising:
crimping lugs to fix the adapter to a pipe or opening in the tank, the lugs forming part of a metal insert overmolded with at least part of the adapter,
wherein the lugs are flexible enough to deform and catch on the pipe or opening in the tank;
wherein the lugs comprise bent portions of the insert which protrude in a radial direction from the insert.

2. The adapter according to claim 1, comprising at least 3 lugs configured to be fixed at regular intervals to the periphery of the pipe or of the opening.

3. The adapter according to claim 1, constituting a filling adapter and comprising a filling head and a nozzle guide, the insert being overmolded by the nozzle guide.

4. The adapter according to claim 1, wherein the insert comprises orifices that are filled with some of the plastic of which the adapter is made.

5. A filling pipe onto which an adapter according to claim 1 is crimped.

6. The filling pipe according to claim 5, wherein the adapter is crimped onto an end of the pipe with an annular surface in contact with a corresponding annular surface on the adapter.

7. The filler pipe according to claim 6, wherein axial movement of the pipe and of the adapter is limited by a compression washer inserted between the corresponding surfaces.

8. The filler pipe according to claim 7, wherein a seal is inserted between the adapter and the pipe or the periphery of the opening, and the seal is located in a channel.

9. The adapter according to claim 1, wherein the lugs extend radially inward toward an interior of the insert.

10. The adapter according to claim 1, wherein the lugs protude into respective holes disposed in the insert.

11. The adapter according to claim 10, wherein the lugs are offset from both axial ends of the insert.

12. The adapter according to claim 1, wherein the lugs form an acute angle with a wall of the insert.

* * * * *